United States Patent
Yamanaka et al.

(10) Patent No.: US 9,985,571 B2
(45) Date of Patent: May 29, 2018

(54) MOTOR DRIVER CIRCUIT AND PROCESS OF MATCHING RECEIVED, DETERMINED VOLTAGES

(71) Applicant: TEXAS INSTRUMENTS INCORPORATED, Dallas, TX (US)

(72) Inventors: Toshio Yamanaka, Plano, TX (US); Shyamsunder Balasubramanian, Plano, TX (US); Toru Tanaka, Plano, TX (US); Mayank Garg, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 43 days.

(21) Appl. No.: 15/143,030

(22) Filed: Apr. 29, 2016

(65) Prior Publication Data

US 2017/0317638 A1 Nov. 2, 2017

(51) Int. Cl.
*H02P 31/00* (2006.01)
*H02H 7/09* (2006.01)
*H02H 7/08* (2006.01)

(52) U.S. Cl.
CPC ........... *H02P 31/00* (2013.01); *H02H 7/0844* (2013.01); *H02H 7/09* (2013.01)

(58) Field of Classification Search
CPC ...... G01R 31/343; G01R 31/42; G01R 31/34; H02K 11/001; G07C 3/00
USPC .......................................................... 318/490
See application file for complete search history.

(56) References Cited

U.S. PATENT DOCUMENTS

| | | |
|---|---|---|
| 2012/0206184 A1* | 8/2012 | Fortier ................... H03G 3/001 327/306 |
| 2016/0043705 A1* | 2/2016 | Tang ....................... H03K 3/012 327/63 |
| 2016/0257249 A1* | 9/2016 | Urase ..................... E05F 15/662 |

* cited by examiner

*Primary Examiner* — Kawing Chan
*Assistant Examiner* — Bradley Brown
(74) *Attorney, Agent, or Firm* — Lawrence J. Bassuk; Charles A. Brill; Frank D. Cimino

(57) ABSTRACT

An apparatus includes a control circuit that includes a configuration register and configured to receive a configuration setting across an external bus. The configuration setting encodes a first voltage state for the apparatus. The control circuit includes an input configured to be coupled to an external electrical device. The control circuit is configured to determine a value of the external device that maps to a second voltage state for the apparatus. The control logic is configured to transition the apparatus to a safe mode upon a determination that the first voltage state does not match the second voltage state.

10 Claims, 2 Drawing Sheets

150 # MOTOR DRIVER CIRCUIT AND PROCESS OF MATCHING RECEIVED, DETERMINED VOLTAGES

BACKGROUND

To varying degrees, safety is a design driver in many electronic systems. For example, in an automotive context, the electrical systems of an automobile should operate correctly and fail to a safe mode to ensure occupant safety. Failing to a safe mode upon detection of a problem in an electrical system is desirable in many non-automotive contexts as well.

SUMMARY

Some embodiments are directed to an apparatus that includes a control circuit including a configuration register and configured to receive a configuration setting for the configuration register that encodes a first voltage state for the apparatus. The control circuit includes an input configured to be coupled to an external resistor. The control circuit is configured to determine a resistance value of the external resistor that maps to a second voltage state for the apparatus. The control logic is configured to transition the apparatus to a safe mode upon a determination that the first voltage state does not match the second voltage state.

In other embodiments, an apparatus includes a control circuit that includes a configuration register and configured to receive a configuration setting across an external bus. The configuration setting encodes a first voltage state for the apparatus. The control circuit includes an input configured to be coupled to an external electrical device. The control circuit is configured to determine a value of the external device that maps to a second voltage state for the apparatus. The control logic is configured to transition the apparatus to a safe mode upon a determination that the first voltage state does not match the second voltage state.

Yet another embodiment is directed to a method that includes determining, by a motor controller, a resistance value of a resistor external to the motor controller. The method further includes transitioning the motor controller to a safe mode when a first voltage state configured into a configuration register of the motor controller does not match a second voltage state mapped to the determined resistance value.

BRIEF DESCRIPTION OF THE DRAWINGS

For a detailed description of various examples, reference will now be made to the accompanying drawings in which.

DETAILED DESCRIPTION

In some electronic systems, a first electronic device transmits programming data to a second electronic device to thereby configure the operation of the second electronic device. If the first electronic device operates improperly, it may incorrectly program the second electronic device thereby causing further operational problems. In the disclosed embodiments, an external electrical component (e.g., a resistor) can be coupled to an input pin of the second electronic device. The value of the external electrical component (e.g., the resistance of a resistor) may be determined and correlated to a particular configuration setting. If multiple configuration settings are possible for the second electronic device, the external electrical component may be selected from a plurality of different values to map to an intended configuration setting for the second device. While the disclosed embodiments can apply to a variety of electrical components such as capacitors, resistors, etc., resistors are discussed below for convenience.

Once the first electronic device provides the configuration setting to the second electronic device, the second electronic device may measure the value of its external resistor. The measured value of the external resistor maps to a configuration setting that should match the configuration setting provided by the first electronic device. If the first electronic device's configuration setting matches the configuration setting that maps to the measured resistance value of the external resistor, then the second electronic device completes the programming process to configure itself per the configuration setting provided by the first electronic device. However, if the first electronic device's configuration setting does not match the configuration setting mapped to the measured resistance value of the external resistor, then the second electronic device transitions its operation to a safe mode.

The safe mode may depend on the function generally performed by the second electronic device. For example, the second electronic device may be a motor driver such as may be used to control a motor in an automobile's power steering system or break system. The safe mode for such a device may be to preclude operation of the motor. In the examples, the second electronic device is a motor driver, but in general, the second device may operate other than to drive a motor or be used in automotive context.

Figure 1:
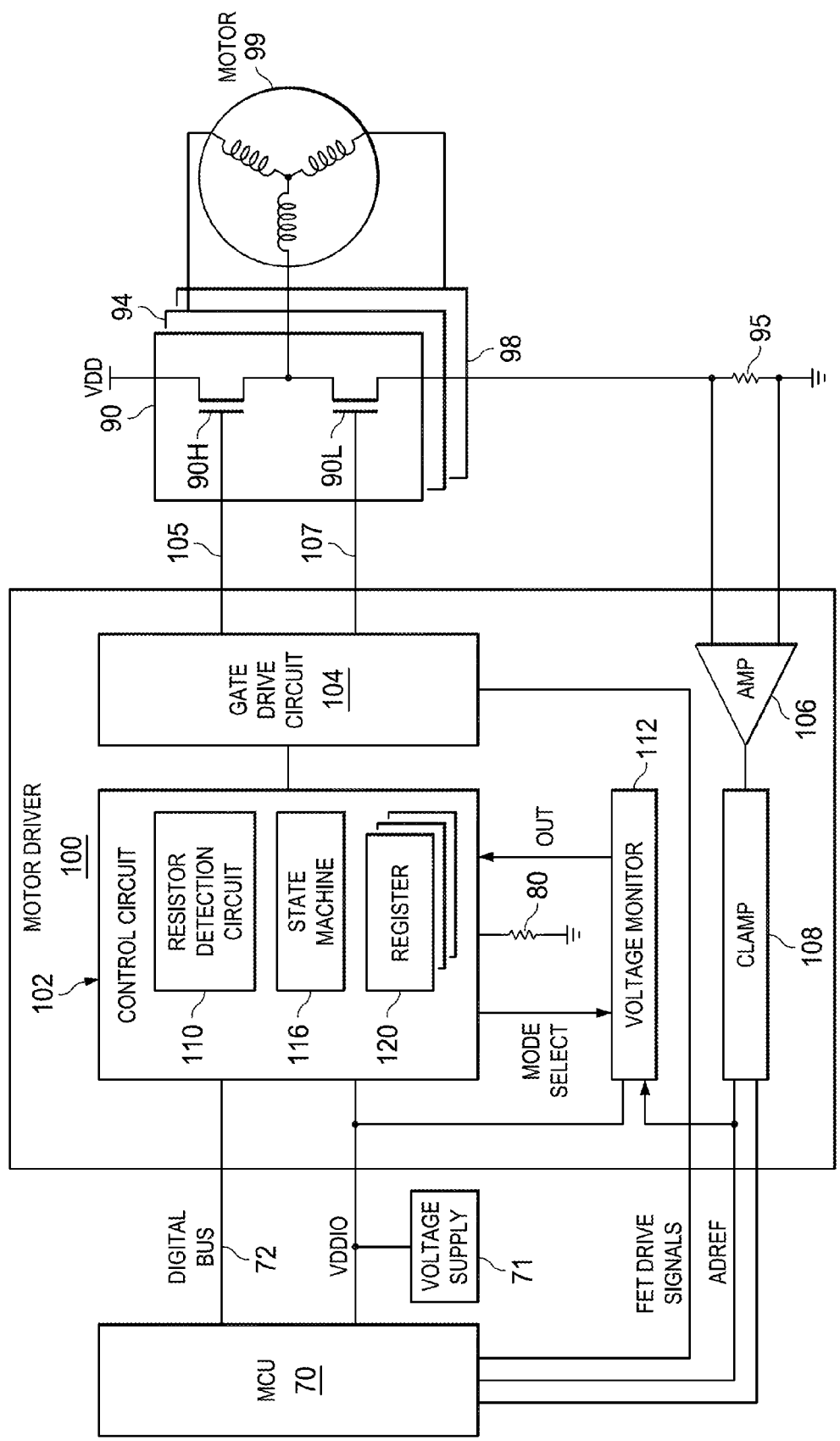
FIG. 1 shows a motor driver circuit programmable by a microcontroller unit that fails to a safe mode upon detection of a problem with the motor driver's programming in accordance with various examples.

FIG. 1 shows an example of motor driver 100 coupled to a microcontroller unit (MCU) 70. The motor driver 100 asserts gate signals 105 and 107 to a pair of external power transistors, which in turn can be coupled to a motor 99. In the example of FIG. 1, the motor is a three-phase motor and thus three pairs of power transistors 90, 94, and 98 can be connected to the motor driver 100 to provide current to the individual phases of the motor. The power transistors may include field effect transistors (FETs). The current through the motor flows to ground through a sense resistor 95 (e.g., a low resistance resistor), the voltage across which is a function of the motor current. The voltage across sense resistor 95 is amplified by amplifier 106 and provided through a clamp circuit to the MCU as shown.

The motor driver 100 includes a control circuit 102, a gate drive circuit 104, the amplifier 106, the clamp circuit 108, and a voltage monitor 112. The control circuit 102 includes a resistor detection circuit 110, a state machine 116, and one or more registers 120. The MCU 70 asserts FET drive signals to the motor driver 100 to thereby cause the motor 99 to spin at a desired speed. The FET drive signals may be received by the gate drive circuit 104, which may generate the gate signals 105 and 107 based on the FET drive signals. In embodiments in which the motor 99 is a multiphase motor, a plurality such as a pair of gate drive signals 105, 107 may be provided to a separate pair of power transistors associated with each of the motor phases. In the example of FIG. 1, the motor 99 is a three phase motor and thus the gate drive circuit 104 generates three pairs of gate drive signals 105, 107—one pair of signals for each power transistor pair 90, 94, and 98.

Each power transistor pair 90, 94, 98 includes a high side transistor and a low side transistor. For example, power transistor pair 90 includes a high side transistor 90H and a low side transistor 90L. The transistors are toggled on and off by the corresponding gate drive signals 105, 107 from the gate drive circuit 104. An inductor and an output capacitor also may be included to generate the appropriate motor drive signals.

A digital bus 72 may be included to connect the MCU 70 to the motor driver 100 and specifically to the control circuit 102. The digital bus 72 is powered by a voltage VDDIO supplied by a voltage supply circuit 71, which may also provide VDDIO to the MCU 70. The digital bus 72 may be used by the MCU 70 to provide configuration settings to the control circuit 102 of the motor driver 100. The control settings may be written to various registers 120 within the control circuit. Some of the registers 120 may be readable and thus the MCU 70 may read such registers via the digital bus 72. In some implementations, the digital bus is a serial bus such as a Serial Peripheral Interface (SPI) bus.

The MCU 70 also can be used to generate an analog-to-digital converter (ADC) reference voltage (ADREF) which is provided to the clamp circuit 108 within the motor driver 100. The ADREF voltage clamps the output of the amplifier 106 to the ADREF voltage level.

In accordance with various embodiments, one or more voltage levels can be implemented for the motor driver 100 by the MCU 70. For example, the voltage level of VDDIO (voltage supply for the digital bus 72) may be any of multiple voltages. In one example, VDDIO may be 3.3V or 5V. Further, the ADREF voltage may be any of multiple voltages, such as 3.3V or 5V. Different voltage levels for VDDIO and for ADREF implicate different voltage over and under voltage thresholds for VDDIO and ADREF. Table I below shows the various combinations of voltage levels for the VDDIO and ADREF voltages.

TABLE I

Voltage Levels

| VDDIO | ADREF |
|---|---|
| 3.3 V | 3.3 V |
| 5 V | 3.3 V |
| 3.3 V | 5 V |
| 5 V | 5 V |

The voltage monitor 112 receives the VDDIO and ADREF voltages, compares them to independent reference voltages, and determines whether either or both of VDDIO and ADREF are too low (under voltage condition) or too high (over voltage condition). The under and over voltage thresholds to which VDDIO and ADREF are compared depend on the voltage levels of VDDIO and ADREF, respectively. For example, for a VDDIO or ADREF voltage of 3.3V, the under voltage threshold may be in the range of 2.7V to 2.9V and the over voltage threshold may be in the range of 3.69V to 3.89V. For a VDDIO or ADREF voltage of 5V, the under voltage threshold may be in the range of 4.1V to 4.4V and the over voltage threshold may be in the range of 5.6V to 5.9V. Once the control circuit 102 has confirmed the voltage state programmed by the MCU 70, the control circuit (e.g., the state machine 116) asserts a mode select signal to the voltage monitor. The voltage select signal indicates the voltage state for the VDDIO and ADREF voltages and/or encodes the under and over voltage reference levels for use by the voltage monitor 112. The output signal (OUT) from the voltage monitor 112 back to the control circuit 102 is indicative of whether the VDDIO/ADREF voltages are within proper limits, or are in an under voltage condition or an over voltage condition. The state machine 116 may cause a transition to a safe mode upon being informed of an under or over voltage condition.

The configuration settings transmitted by the MCU 70 to the control circuit 102 of the motor driver 100 include, possibly among other settings, the voltage state for the motor driver. The voltage state may specify the voltage for VDDIO and for ADREF in accordance with some embodiments. The configuration settings from the MCU 70 that reflect the desired voltage state may be written to a corresponding configuration register within the registers 120. In some embodiments, two bits of one of the registers may be used to encode the various possible voltage states. In the example of Table I above, there are four possible voltage states as shown, and thus two bits may be dedicated to encode the four possible voltage states in this example.

Once the MCU 70 writes the configuration register 120 within the motor driver 100 with the voltage state of the motor driver (e.g., the VDDIO and ADREF voltages), the motor driver determines whether the MCU-programmed voltage state is consistent with an external resistor 80 connected to the motor driver's control circuit 102. The external resistor 80 maps to a voltage state for the motor driver 100 that should be consistent with the voltage state programmed by the MCU 70. In embodiments in which there are four voltage states (i.e., four combinations of two voltages each for VDDIO and ADREF such as defined above in Table I), the external resistor 80 is selected to have one of four different resistance values. Each resistance value maps to a different voltage state.

The voltage state to which the external resistor 80 maps should match the voltage state programmed in to a register 120 by the MCU 70. If the voltages states do not match, then the state machine 116 transitions the mode of operation to a safe mode. In some embodiments, the safe mode may to disable the gate drive circuit 104 from asserting gate signals 105, 107 to the power transistor pairs 90, 94, 98 to thereby prevent the motor 99 from operating. The safe mode can be implemented differently in other embodiments. However, if the voltage states match, then the state machine 116 transitions to an operational mode in which the motor 99 can be operated, or remains in such an operational mode if already in that mode.

As noted above, the resistance value of the external resistor maps to an intended voltage state for the motor driver 100. In embodiments in which there are four possible voltage states (i.e., four combinations of two voltages for each of VDDIO and ADREF), the external resistor 80 has one of four different resistance values. Table II provides the possible resistance values for the external resistor and the voltage state to which each resistance value maps.

TABLE II

External Resistor Resistance Values and Mapping Voltage States

| Min (kΩ) | Typ (kΩ) | Max (kΩ) | VDDIO (v) | ADREF (v) |
|---|---|---|---|---|
| 135 | 150 | 165 | 3.3 | 3.3 |
| 46 | 51 | 56.5 | 5 | 3.3 |

TABLE II-continued

External Resistor Resistance Values and Mapping Voltage States

| Min (kΩ) | Typ (kΩ) | Max (kΩ) | VDDIO (v) | ADREF (v) |
|---|---|---|---|---|
| 13.5 | 15 | 16.5 | 3.3 | 5 |
| 4.6 | 5.1 | 5.65 | 5 | 5 |

For example, if the voltage state for the motor driver 100 is intended to be 3.3v for VDDIO and 3.3v for ADREF as well, then the external resistor 80 should be selected to have a resistance between 135 kΩ and 165 kΩ. Similarly, for a voltage state intended to be 5v for VDDIO and 3.3v for ADREF, the external resistor 80 should have a resistance between 46 kΩ and 56.5 kΩ. For a voltage state intended to be 3.3v for VDDIO and 5v for ADREF, the external resistor 80 should have a resistance between 13.5 kΩ and 16.5 kΩ. Finally, for a voltage state intended to be 5v for each of VDDIO and ADREF, the external resistor 80 should have a resistance between 4.6 kΩ and 5.65 kΩ.

Figure 2:
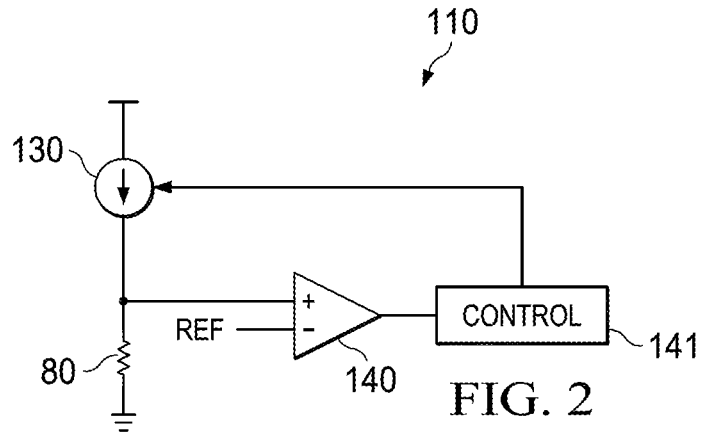
FIG. 2 illustrates a circuit for determining the value of resistance of a resistor external to the motor controller in accordance with various examples.

The resistor detection circuit 110 determines the resistance value of the external resistor 80. FIG. 2 illustrates an implementation of the resistor detection circuit 110 in accordance with an embodiment. In this example, the resistor detection circuit 110 includes a voltage comparator 140, a control unit 141, and a voltage controlled current source 130. The voltage controlled current source 130 can be configured to produce a predetermined amount of current through the external resistor 80 based on the voltage of a control signal to the current source from the control unit 141. The voltage comparator 140 compares the voltage that results across the resistor 80 to a reference voltage and the output of the comparator 140 is provided the control unit 141. The voltage magnitude of the control signal is varied to thereby vary the magnitude of the current (e.g., from a lower current level to a higher current level) through the resistor 80, and the output of the comparator 140 is monitored by the control unit 141 until the comparator's output flips state (e.g., from low to high). The current source 130 is configured by the control signal to produce varying levels of current that map to the various resistor values. The control signal/current source current for which the comparator changes state (e.g., goes high) maps to one of the known resistance values that are possible for the resistor 80.

In some embodiments, the process to determine the resistance value of the external resistor 80 may be performed during a power-on event for the motor driver 100. Once the resistor's resistance value is determined, the motor driver 100 (e.g., the state machine 116 or resistor detection circuit 110) maps the determined resistance value to a voltage state for the motor driver 100. The mapped voltage state then may be recorded in one of the registers 120 and used to subsequently confirm the voltage state programmed by the MCU 70.

Figure 3:
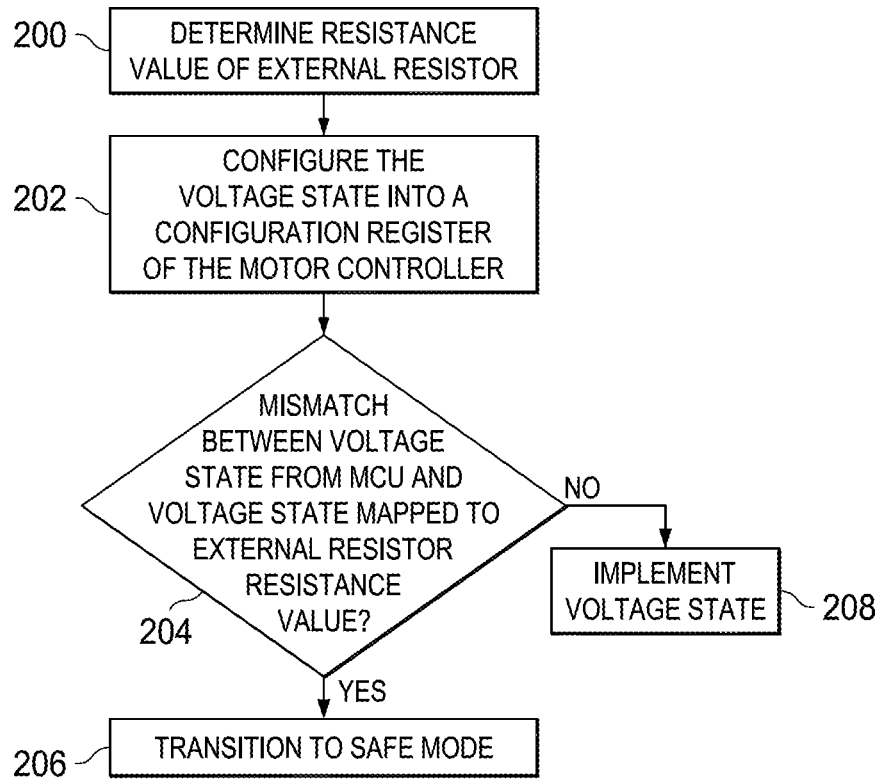
FIG. 3 shows a flow chart depicting a method in accordance with various examples.

FIG. 3 illustrates a process flow for determining whether the voltage state programmed by the MCU 70 matches the voltage state to which the external resistor maps. At 200, the method includes determining the resistance of the external resistor 80. This operation may be performed using the resistor detection circuit 110 and may be performed during device power-up. Once the resistance of the resistor 80 is determined, the state machine 116 may write a value to one of the registers 120 indicating the voltage state as determined according to the value of the resistor.

At 202, the method includes configuring the voltage state into a configuration register of the motor controller 100. This operation may be performed by the MCU transmitting a set of bits across the digital bus 72 which are then written to specific bit locations with one of the registers 120. The bits encode the programmed voltage state for the motor driver 100 such as the voltage states illustrated in Table I above.

At 204, the method includes determining whether voltage state as determined based on the resistance value of the external resistor 80 (and stored in a register 120) matches the voltage state configured into a register 120 by the MCU 70. If a mismatch is detected, then control flows to operation 206 at which the motor driver's mode is transitioned to a safe mode as explained above. Otherwise, at 208, the power state configured by the MCU 70 (and confirmed by measuring the resistance of the external resistor 80) is implemented. This operation may include configuring under and over voltage thresholds in the voltage monitor 112 to thereby facilitate a determination of an under or overvoltage condition for the VDDIO or ADREF voltages.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A motor driver circuit comprising:
    (a) a control circuit coupled to a digital bus connection and a VDDIO voltage supply input, having a gate drive output, a mode select output, and a monitor input, and including a resistor detection circuit having:
        (i) a comparator having a reference voltage input, an input coupled to an external resistor connection, and an output;
        (ii) a control unit having an input coupled to the output of the comparator and a control output; and
        (iii) a voltage controlled current source having a control input coupled to the control output and an output coupled to the resistor connection;
    (b) gate drive circuitry having a gate drive input coupled to the gate drive output, an FET drive signal input, and gate drive signal outputs;
    (c) a voltage monitor having a mode select input coupled to the mode select output, an input coupled to the VDDIO voltage supply input, an analog to digital reference voltage input, and a monitor output coupled to the monitor input; and
    (d) a clamp circuit and amplifier coupled in series between sense resistor inputs and a sense resistor output, the clamp circuit having an input coupled to the analog to digital reference voltage input.

2. The motor driver circuit of claim 1 including a three phase motor coupled to the gate drive circuitry.

3. The motor driver circuit of claim 1 including a microcontroller unit coupled to the digital bus connection and the sense resistor output.

4. The motor driver circuit of claim 1 including a three phase motor coupled to the gate drive circuitry, a sense resistor connected between the motor and ground, and the sense resistor inputs being coupled to the sense resistor.

5. The motor driver circuit of claim 1 in which the VDDIO and analog to digital reference (ADREF) voltages are:

| VDDIO | ADREF |
|-------|-------|
| 3.3 V | 3.3 V |
| 5 V   | 3.3 V |
| 3.3 V | 5 V   |
| 5 V   | 5 V.  |

6. A process of operating an electronic system comprising:
   (a) receiving bits indicating a first voltage state in a configuration register of the electronic system data;
   (b) determining the value of an external electrical component connected to the operating circuitry with component detection circuitry of the electronic system;
   (c) mapping the value of the external electrical component to a second voltage state in control circuitry of the electronic system;
   (d) receiving data bits indicating the second voltage state in the configuration register;
   (e) comparing in the control circuitry the first voltage state and the second voltage state;
   (f) implementing the first voltage state in the electronic system when the first voltage state is the same as the second voltage state; and
   (g) implementing a safe mode in the electronic system when the first voltage state is not the same as the second voltage state.

7. The process of claim 6 in which the determining includes determining upon startup of the electronic system.

8. The process of claim 6 including determining under and over voltage conditions after startup of the electronic system in a voltage monitor of the electronic system.

9. The process of claim 6 in which the determining includes varying a voltage controlled current source in response to sensing a voltage at the electrical component.

10. The process of claim 6 including sensing current flow through a sense resistor separate from the determining.

* * * * *